Patented June 10, 1952

2,599,576

UNITED STATES PATENT OFFICE 2,599,576

ADHESIVE SHEET OR TAPE

Vlon Neilan Morris, Highland Park, Charles Leslie Weidner, Cranbury, N. J., and Laszlo Walter Eger, East Hampton, Conn., assignors to Industrial Tape Corporation, a corporation of New Jersey No Drawing. Application January 27, 1949, Serial No. 73,214

9 Claims. (Cl. 117—68.5)

This invention relates to adhesive sheets or tapes comprising backings presenting nonfibrous surfaces with normally tacky pressure-sensitive adhesives united thereto. This application is a continuation in part of our copending application Ser. No. 514,724 filed December 17, 1943, now abandoned.

Articles of this type have been known for some time and pressure-sensitive adhesive sheets comprising regenerated cellulose ("cellophane") backings and rubber-resin-type pressure-sensitive adhesives have found a wide variety of uses. Rubber-resin adhesives, however, have certain disadvantages, i. e., they age poorly upon exposure to heat and ultraviolet light, and possess a strong tendency to darken as a result of such treatment. Furthermore, their high susceptibility to organic solvents, and extremely hydrophobic properties interfere with their lasting application to surfaces which are even slightly moist or damp. Regenerated cellulose, on the other hand, is extremely moisture-sensitive. Indeed, so incompatible are the extremely hydrophobic rubber-resin type adhesives with the extremely hydrophylic regenerated cellulose sheetings that their combination in an adhesive tape requires the application of an intermediate primer coat to render the tape commercially usable.

Recent research, however, has produced radically new types of pressure-sensitive adhesives, devoid of the majority of the disadvantages inherent in rubber-resin adhesive compositions. Examples of such adhesives are the polyvinyl acetal adhesives disclosed in U. S. application Serial No. 503,534, filed September 23, 1943 by Nelson et al., the butadiene-vinyl copolymer adhesives disclosed in U. S. application Serial No. 508,069, filed October 28, 1943 by Pike et al., both now abandoned and other adhesives that may be mentioned. Such adhesives may be combined with synthetic non-fibrous backings as, for example, regenerated cellulose, vinyl polymers, ethyl cellulose, rubber derivatives, and other commercially available films. The film selected depends upon its compatibility with the adhesive, and combinations of pressure-sensitive adhesives and the synthetic backings mentioned are possible which are so highly compatible that even under the most rigid conditions of service it is unnecessary to use an intermediate primer coating to prevent offsetting of the adhesive from the backing.

In spite of this inherent advantage, little use has been made of these highly affinitive combinations prior to the instant invention. Paradoxically, the reason for this resides in the extremely great affinity of such backings and adhesives for each other. Whenever a normally adhesive coating is applied to a highly compatible film backing and the resulting tape is rolled or stacked up, "freezing" occurs between the adhesive united to the backing of one layer of tape and the backing of the adjacent layer of tape, in the absence of some means to prevent it. When "freezing" occurs, unwinding of the tape or the removal of one layer from another in general and subsequent successful use is impossible.

According to the instant invention, there is provided an adhesive tape or sheet which includes in combination a film backing presenting a nonfibrous surface having a highly compatible pressure-sensitive adhesive united directly thereto, and an adhesive-repellent coating or film which serves when a plurality of layers of tape or sheet are in superposed relation to prevent "freezing" or permanent joinder of one layer of tape to the other. In the preferred embodiment of the invention, there is united to a nonfibrous film backing on the surface thereof opposite that to which the adhesive is applied, a thin film or coating of an adhesive-repellent material which is compatible with the backing but quite incompatible with the adhesive. Depending upon the material used, the film is applied to the nonfibrous backing by solvent spreading or heat lamination or both either before or after the adhesive is applied to the opposite surface of the backing and before the resultant product is wound or stacked up. Obviously any other suitable methods of applying the adhesive-repellent film or coating to the backing will suffice.

By way of defining the adhesive-repellent coating or film, it is one that possesses little or no affinity for the adhesive. To state it differently, the adhesive-repellent coating or film is one to which the normally tacky and pressure-sensitive mass will adhere but slightly because of incompatibility. This property is the prime requirement for the adhesive-repellent film or coat. Flexibility and good anchorage to the nonfibrous film backing are likewise necessary. Transparency also is a factor where that property is desired in the finished tape or sheet. Where incompatibility with the adhesive and good anchorage to the highly affinitive backing are difficult to obtain in one substance, a suitable adhesive-repellent coat may include a combination of an adhesive-incompatible component and a component compatible with the backing. Such combinations may be included in one chemical compound or copolymer, two or more different substances in colloidal dispersion, or in other chemical or physical combinations.

Cellulose esters and ethers have proven quite satisfactory as adhesive-repellent coats in adhesive tapes or sheets employing adhesives containing, as the film forming constituent, polyvinyl acetals, polyvinyl ethers, glue, and similar types of pressure-sensitive adhesives anchored intimately to backings with which they are highly compatible. Thus, nitrocellulose may be used as an adhesive-repellent on a backing of regenerated cellulose to which one or another of the above adhesives is applied. If desired, the nitrocellulose repellent coating may contain a small amount of a suitable plasticizer such as a modified glycerol-phthalic anhydride resin, and a trace of wax. Thin films of these coatings are preferably applied by heat to the surface of the backing opposed to the adhesive.

Cellulose acetate heat laminated in extremely thin sheets as an adhesive-repellent film or coat to otherwise adhesive-compatible backings gives very good results. In addition to the adhesives mentioned, this material is also satisfactory with adhesives containing rubber, synthetic rubber, and other types of synthetic pressure-sensitive adhesives used in conjunction with a backing highly compatible with such adhesives.

Methyl cellulose makes an excellent adhesive-repellent and can be anchored to a variety of backing materials by an agglutinant such as polyvinyl alcohol, casein and glue. Satisfactory tapes may be made using a 4% aqueous solution containing equal parts by weight of high viscosity methyl cellulose and high viscosity polyvinyl alcohol.

Adhesive-repellent films or coats may also be made from acrylic polymers such as methyl methacrylate, methyl acrylate, and other acrylates and methacrylates. These preferably are applied from aqueous emulsions. Best results on "cellophane" were obtained using an emulsion of a copolymer comprising largely methyl methacrylate in combination with a sufficient amount of polyvinyl alcohol to effect anchorage of the methacrylate to the backing. Good unwinding from a roll was observed where these separator coats faced normally tacking adhesives of the polyvinyl acetate, polyvinyl acetal, e. g. polyvinyl butyral, and related types.

Fair repellency to vinyl polymer and alkyd type adhesives may be obtained by using as a separator coat butadiene copolymers, preferably the commercial dispersions of copolymers of butadiene and styrene, or acrylonitrile such as Hycar latices OS10, OS20 and OR (produced in this country by the Hydrocarbon Chemical and Rubber Company of Akron, Ohio).

In some instances it may be desirable to apply the adhesive-repellent coating directly to a nonfibrous adhesive backing. In such cases a result somewhat similar to that heretofore described may be obtained by using an interliner having its surface which lies adjacent the adhesive of one layer of tape treated with an adhesive-repellent coating.

There are given below specific examples of various types of adhesives and adhesive-repellents suitable for coating on a cellophane or a regenerated cellulose backing in accordance with the invention. Preferably the weight of adhesive coating which is applied to one surface of the backing is of the order of ¾ to 1½ ozs. per square yard. The repellent which is coated on the opposite surface of the backing is of the order of ⅕ of an oz. per square yard down to a minimum weight per square yard which will give a continuous coating.

ADHESIVE MASSES

Type A:

| | Parts by weight |
|---|---|
| Polyvinyl isobutyl ether (intrinsic viscosity range 3 to 3½) | 500 |
| Polyvinyl isobutyl ether (intrinsic viscosity range .4 to .8) | 215 |
| Plasticizing agent | 150 |
| Tackifying resin | 100 |

Of necessity the plasticizing agent and the tackifying resin are compatible with the other ingredients of the mass. By way of example there is suggested as a suitable plasticizing agent, white mineral oil, and as suitable tackifying resins the glycerol, glycol, mixed glycerol-glycol, or methyl esters of hydrogenated rosin.

Type B:

| | Parts by weight |
|---|---|
| Polyvinyl isopropyl ether (intrinsic viscosity 11) | 100 |
| Plasticizing agent | 20 |
| Tackifying resin | 100 |

Here, too, as in the case of the adhesive of Type A, and of the adhesives to follow, it is essential that the plasticizing agent and the tackifying resin be compatible with the other ingredients in the mass. The same and similar plasticizing agents and tackifying resins may be used as in the Type A adhesive, and in addition there may also be used as a tackifying agent, the lower alkyl esters of hydrogenated rosin having a melting point below 25° C., for example, methyl ester of hydrogenated rosin. For lower viscosity ethers, the tackifying resins and plasticizing agents could be used in smaller proportions.

Type C:

| | Parts by weight |
|---|---|
| Polyethyl acrylate (plasticity 2.5 to 2.8 millimeters as measured on a Scott plastimeter with a 2 gr. pellet and under a compressional load of 10 lbs. at 100° C. for 5 minutes) | 80 |
| Polyvinyl ethyl ether (intrinsic viscosity 2.2 to 2.8) | 160 |
| Tackifying resin | 40 |

Suitable tackifying resins are those suggested in connection with the adhesive of Type A.

Type D:

| | Parts by weight |
|---|---|
| Polyvinyl butyral (hydroxyl content approx. 10%, viscosity 65 to 100 centipoises [1]) | 160 |
| Polyvinyl butyral (hydroxyl content approx. 20%, viscosity 20 to 30 centipoises [1]) | 80 |
| Plasticizing agent | 320 |
| Tackifying resin | 320 |

[1] Viscosity measured in 5% solution in alcohol containing 99.5% ethyl alcohol and 0.5% benzene.

By way of example, there is suggested as a compatible plasticizing agent for this mass, castor oil, and as a compatible tackifying resin, glycerol ester of hydrogenated rosin.

ADHESIVE-REPELLENTS

A few suggested adhesive repellents which have been found to work successfully with various of the foregoing adhesive masses are as follows. The parts given are all on a weight basis.

Example 1

A solution is prepared by dissolving 30 parts of polyvinyl acetate (softening point approximately 90° F., viscosity 1.0–1.5 centipoises) in 70 parts acetone and 70 parts toluene. A second solution which is an agglutinant solution is prepared by dissolving 14 parts of polyvinyl alcohol (75% hydrolized, viscosity approximately 50 centipoises measured in 4% aqueous solution) in 43 parts water and 43 parts ethyl alcohol. The polyvinyl acetate solution is added in desired proportions to the polyvinyl alcohol solution, with agitation to effect emulsification.

This polyvinyl acetate-polyvinyl alcohol repellent was found to perform successfully with the various adhesive masses described in the following ratios:

|  | Ratio of polyvinyl acetate to polyvinyl alcohol |
|---|---|
| Type A (polyvinyl isobutyl ether) | 1:2 |
| Type B (polyvinyl isopropyl ether) | 1:2, 2:1 |
| Type C (polyethyl acrylate) | 1:2, 1:1, 2:1 |
| Type D (polyvinyl butyral) | 1:2, 1:1, 2:1 |

In all examples, the ratios given compare the weights of the respective materials which are present in the adhesive-repellent mixture.

Example 2

A solution is prepared by dissolving 15 parts of polyvinyl butyral (hydroxal content 7%, intrinsic viscosity 1.2) in 25.5 parts ethyl alcohol and 59.5 parts toluene. This solution is mixed with the polyvinyl alcohol solution of Example 1 in proportions to obtain the desired workable ratios. This repellent performed successfully with the various adhesive masses as follows:

|  | Ratio of polyvinyl butyral to polyvinyl alcohol |
|---|---|
| Type A | 1:2, 2:1 |
| Type B | 1:2, 2:1 |
| Type C | 1:2, 1:1, 2:1 |

Example 3

A solution is prepared by dissolving 20 parts Vinylite VMCH (an interpolymer comprising 86% vinyl chloride, 13% vinyl acetate and 1% maleic anhydride, molecular weight 55,000 by the osmotic method, intrinsic viscosity 0.53 at 20° C.) in 16 parts acetone and 64 parts toluene. This solution is mixed with the polyvinyl alcohol solution of Example 1 in proportions to give the desired workable ratios. This repellent performed successfully with the various adhesive masses as follows:

|  | Ratio of "Vinylite" to polyvinyl alcohol |
|---|---|
| Type A | 1:2, 2:1 |
| Type B | 1:2, 2:1 |
| Type C | 1:2, 1:1, 2:1 |
| Type D | 1:2, 1:1, 2:1 |

Example 4

A solution is prepared by dissolving 15 parts of cellulose acetate (acetyl content 54–55%, viscosity 25 to 50 centipoises) in 85 parts acetone and 50 parts toluene. This solution was mixed with the polyvinyl alcohol solution of Example 1 in proportions to obtain the desired workable ratios. This repellent performed successfully with the various adhesive masses as follows:

|  | Ratio of cellulose acetate to polyvinyl alcohol |
|---|---|
| Type A | 1:2 |
| Type B | 1:2 |
| Type C | 1:2 |

Example 5

A 6% solution of methyl cellulose (methoxy content 29–32%, viscosity approximately 100 centipoise measured in 2% aqueous solution) in water and a 6% solution of carboxy methyl cellulose (ammonium salt, carboxy-methyl content 0.7%, viscosity 400 to 600 centipoises measured in 2% aqueous solution) in water are mixed to obtain the desired workable ratios. The repellent performed successfully with the various adhesive masses as follows:

|  | Ratio of methyl cellulose to carboxy methyl cellulose |
|---|---|
| Type A | 1:1, 2:1 |
| Type B | 1:1, 2:1 |
| Type C | 1:1, 2:1 |

Example 6

A 6% solution of methyl cellulose in water and a 20% solution in water of a good hide glue having a gel strength of 40 to 180 are mixed together to obtain the desired workable ratios. This type of repellent must be applied warm to the backing. It performs successfully as an adhesive-repellent with the various adhesive masses as follows:

|  | Ratio of methyl cellulose to glue |
|---|---|
| Type A | 1:2 |
| Type B | 1:2 |
| Type C | 1:2 |
| Type D | 1:1 |

Example 7

A 6% solution of methyl cellulose in water and a 10% solution in water of a commercial casein glue are mixed to obtain the desired workable ratios. A minimum amount of ammonium hydroxide is added to insure that the casein goes completely in solution. This mixture performs successfully as an adhesive-repellent with the various adhesive masses as follows:

|  | Ratio of methyl cellulose to casein |
|---|---|
| Type A | 1:2 |
| Type B | 1:2 |
| Type D | 1:1 |

Example 8

A 6% solution of methyl cellulose in water mixed with the polyvinyl alcohol solution of Example 1 in proportions giving a ratio of 1 part methyl cellulose to 2 parts polyvinyl alcohol, and a ratio of 1 part methyl cellulose to 1 part polyvinyl alcohol, produces an adhesive-repellent which performs successfully with the Type D adhesive mass.

Example 9

Polyethyl acrylate emulsion mixed with a solution of casein in proportions sufficient to give a ratio of 1 part polyethyl acrylate to 1 part casein produces an adhesive-repellent which performs successfully with the Type D adhesive mass.

Example 10

The polyvinyl alcohol solution of Example 1 will itself perform successfully as an adhesive-repellent with the Type A and the Type D adhesive masses.

The ratio of repellent to agglutinant in the adhesive-repellent should be one which in the finished tape will provide an adhesive-repellent that will neither strip from the backing under the action of the adhesive nor strip the adhesive from the backing when the tape is unrolled.

Both polyvinyl ethers and polyvinyl acetals are polymers which include in the recurring unit, one vinyl group, one substitutional radical, and 1-2 ether linkages joining said substitutional radical to said vinyl group. Accordingly both of these types of compounds are comprehended wherever mention is made herein of this general class of compounds.

The invention has been described in its preferred form and many modifications thereof are included within its spirit. It will be understood therefore that the invention is limited only by the prior art and the scope of the appended claims. In this connection it should be noted that the claims refer to an "adhesive sheet." This term shall be construed as including also an adhesive tape.

We claim:

1. A normally tacky pressure-sensitive adhesive sheet comprising a pressure-sensitive adhesive having, as one of its basic constituents, a material selected from group consisting of polyvinyl ethers, polyvinyl acetals, and polyethyl acrylate, united directly on one surface of a flexible non-fibrous backing film, and a flexible adhesive-repellent film united onto the other surface of said backing, such adhesive repellent film comprising about one hundred parts by weight of a material selected from the group consisting of methyl cellulose and cellulose acetate, and about fifty to two hundred parts by weight of an agglutinant selected from the group consisting of polyvinyl alcohol, casein, carboxymethylcellulose and glue.

2. An adhesive sheet according to claim 1, wherein the repellent material comprises methyl cellulose.

3. An adhesive sheet according to claim 1, wherein the agglutinant comprises polyvinyl alcohol.

4. An adhesive sheet according to claim 3, wherein the ratio of methyl cellulose to polyvinyl alcohol is about one to one.

5. An adhesive sheet according to claim 3, wherein the pressure-sensitive adhesive comprises a polyvinyl acetal.

6. An adhesive sheet according to claim 1, wherein the adhesive comprises a polyvinyl ether.

7. An adhesive sheet according to claim 6, wherein the adhesive comprises a polyvinyl isobutyl ether.

8. An adhesive sheet according to claim 6, wherein the adhesive comprises polyvinyl isopropyl ether.

9. An adhesive sheet according to claim 8, wherein the adhesive comprises a polyvinyl ether.

VLON NEILAN MORRIS.
CHARLES LESLIE WEIDNER.
LASZLO WALTER EGER.

REFERENCES CITED

The following references are of record in the file of this patent:

UNITED STATES PATENTS

| Number | Name | Date |
|---|---|---|
| 1,962,340 | Dow | June 12, 1934 |
| 2,027,436 | Kallender et al. | Jan. 14, 1936 |
| 2,147,772 | Kallender et al. | Feb. 21, 1939 |
| 2,364,875 | Schieman | Dec. 12, 1944 |